United States Patent [19]
Keryk et al.

[11] Patent Number: 4,596,720
[45] Date of Patent: Jun. 24, 1986

[54] RADIATION-CURABLE ORGANOPOLYSILOXANE COATING COMPOSITION

[75] Inventors: John R. Keryk, Mills Township, Midland County; Peter Y. Kwai Lo, Midland, both of Mich.

[73] Assignee: Dow Corning Corporation, Midland, Mich.

[21] Appl. No.: 783,714

[22] Filed: Oct. 3, 1985

[51] Int. Cl.$^4$ .............................................. B05D 3/06
[52] U.S. Cl. ..................................... 427/54.1; 427/35; 428/447; 428/448; 528/30; 528/32; 522/99
[58] Field of Search ..................... 522/99; 528/32, 30; 427/54.1, 35; 428/447, 448

[56] References Cited

U.S. PATENT DOCUMENTS

| | | | |
|---|---|---|---|
| 3,350,351 | 10/1967 | Hansen et al. | 260/46.5 |
| 3,873,499 | 3/1975 | Michael et al. | 260/46.5 |
| 3,907,852 | 9/1975 | Oswald et al. | 260/448.2 |
| 4,052,529 | 10/1977 | Bokerman et al. | 428/537 |
| 4,064,027 | 12/1977 | Gant | 204/159.13 |
| 4,107,390 | 8/1978 | Gordon et al. | 428/447 |

FOREIGN PATENT DOCUMENTS 1569681  6/1980  United Kingdom .

*Primary Examiner*—Melvyn I. Marquis
*Attorney, Agent, or Firm*—James E. Bittell

[57] ABSTRACT

Compositions curable by exposure to UV or electron beam are disclosed which contain mercapto functional organosiloxanes and organosiloxanes bearing alkenyl groups with 6 or more carbon atoms. The compositions cure upon irradiation without the emission of obnoxious odor which characterizes the analogous composition of the art containing olefinic siloxanes having only vinyl unsaturation. Also disclosed is a method of treating a substrate with the coating composition to improve the release of adhesive materials therefrom.

23 Claims, No Drawings

RADIATION-CURABLE ORGANOPOLYSILOXANE COATING COMPOSITION

BACKGROUND OF THE INVENTION

This invention relates to improved radiation-curable silicone compositions and to their use in a coating method. More particularly, this invention relates to compositions containing mercaptoalkyl functional siloxanes and alkenyl functional siloxanes which cure upon exposure to radiation.

The application of siloxane compositions to provide coatings of various substrates, for example, to improve the release of adhesive and other materials therefrom, has been practiced for many years. Although the conventional siloxane release coating compositions normally perform satisfactorily in use, there is a continuing demand for improved compositions. In particular a need has been expressed for compositions which cure faster and which require the application of less energy for the curing step. Also if such compositions can be applied in the absence of a solvent or other diluent, an additional advantage is realized.

Radiation curable coating compositions containing an organopolysiloxane bearing mercaptoorgano radicals and a polymethylvinylsiloxane curing agent are known from the disclosures of Michael, et al., U.S. Pat. No. 3,873,499; Gant, U.S. Pat. No. 4,064,027; and Bokerman, et al., U.S. Pat. No. 4,052,529. However, these compositions met resistance in the market place because they emitted an obnoxious odor after the cure process. The odor was quite noticeable, especially when the compositions were used in thin layer applications, such as in a paper coating process.

In order to reduce the odor associated with radiation cure of these types of coating compositions, Gordon, et al., U.S. Pat. No. 4,107,390, teach that the polymethylvinylsiloxanes in the compositions can be replaced by 1,1'-oxybis(1-methyl-1-silacyclopentene). Takamizawa, et al., G.B. Pat. No. 1,569,681, further teach UV curable compositions comprising (a) an organopolysiloxane having in the molecule at least one mercapto-containing organosiloxane unit, (b) an organopolysiloxane having in the molecule at least one allyl-containing organosiloxane unit, and (c) a photosensitizer. Although the odor associated with curing the compositions of these patents is not as marked as that with the vinyl-containing compositions, the unsaturated components used in these compositions are difficult and relatively expensive to prepare.

In still another attempt to reduce the odor associated with radiation cure of siloxane coating compositions, White, et al., copending U.S. patent application Ser. No. 713,940 which is owned by the assignee of this patent application, teach UV curable compositions comprising (a) mercapto group containing organosiloxane, (b) an organosiloxane having at least two siloxane units bearing cyclohexenylethyl substituents ($C_6H_9CH_2CH_2-$), and (c) a photoinitiator. However, there is still a need for siloxane coating compositions which will cure with lower levels of UV radiation and lower levels of electron beam radiation.

Oswald et al., U.S. Pat. No. 3,907,852, teach the selective monoaddition of silanes to α, ω-dienes to form ω-alkenylsilanes which are then reacted with phosphine to form silylalkyl phosphines.

Hansen et al., U.S. Pat. No. 3,350,351, teach free radical vulcanization of a copolymer consisting of 40 mol percent 3-cyanopropylmethylsiloxane units, 58 mol percent of dimethylsiloxane units and 2 mol percent of 7-octenylmethylsiloxane units.

SUMMARY OF THE INVENTION

It is an object of this invention to provide an improved silicone coating composition that cures rapidly upon exposure to either UV or electron beam radiation without the problem of obnoxious odor emission.

The radiation-curable composition of the present invention comprises: (A) a triorganosiloxane-endblocked polydiorganosiloxane polymer having a viscosity of at least 100 centistokes at 25° C., wherein from 50 to 99 mole percent of all organic radicals are methyl, from 1 to 10 mole percent of all organic radicals are mercapto radicals represented by the formula —RSH wherein R denotes a divalent saturated aliphatic hydrocarbon group having from 2 to 8 carbon atoms, any remaining organic radicals in (A) being phenyl radicals or alkyl radicals having from 2 to 6 carbon atoms and (B) an organosiloxane, compatible with polymer (A), having in the molecule at least two siloxane units of the general formula

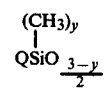

wherein y is 1 or 2 and Q is an unsaturated radical independently selected from the group consisting of the vinyl radical and higher alkenyl radicals represented by the formula —R'$(CH_2)_m$CH=$CH_2$ wherein R' denotes —$(CH_2)_n$— or —$(CH_2)_p$CH=CH— and m has the value of 1, 2, or 3; n has the value of 3 or 6; and p has the value of 3, 4, or 5, with the proviso that at least 50 mole percent of the unsaturated radicals are higher alkenyl radicals, any remaining siloxane units having the general formula

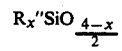

wherein x is 2 or 3 and R" denotes a saturated monovalent hydrocarbon group having from 1 to 6 carbon atoms, at least 50 mole percent of the total R" groups being methyl, the amounts of (A) and (B) being sufficient to provide a total of from 0.2 to 2.0 unsaturated radicals for every mercapto radical in the composition.

The present invention further comprises a method of treating a substrate with the above composition to improve the release of adhesive materials therefrom.

DETAILED DESCRIPTION OF THE INVENTION

The radiation-curable compositions of the present invention are obtained by mixing components comprising (A) a mercapto-functional organosiloxane polymer and (B) an organosiloxane bearing terminally unsaturated alkenyl groups.

Mercapto functional organosiloxane polymers most useful in this invention are triorganosiloxane-endblocked polymers having a viscosity at 25° C. of at least 100 centistokes. It is preferred that the polymer have a viscosity at 25° C. of 100 to 1000 centistokes so that the coating composition containing the polymer can be easily applied to substrates without adding significant amounts of solvent. It is even more preferred that the polymer have a viscosity at 25° C. of 200 to 600 centistokes so that solventless coating compositions containing the polymer will not soak into or penetrate substrates such as paper to an undesirable degree and will provide more durable cured coatings.

The mercapto functional organosiloxane polymers, (A), are made up of diorganosiloxane units of the formula $Z_2SiO$ and chain terminating unit of the formula $Z_3SiO_{\frac{1}{2}}$ wherein Z denotes an organic radical, independently selected from the group consisting of the methyl radical, phenyl radical, alkyl radicals having 2 to 6 carbon atoms, and mercapto radicals represented by the formula —RSH wherein R denotes a divalent saturated aliphatic hydrocarbon group having from 2 to 8 carbon atoms. Generally the Z radicals in the polymers are 50 to 99 mole percent methyl radicals and 1 to 10 mole percent mercapto radicals with any remaining Z radicals being phenyl radicals or alkyl radicals of 2 to 6 carbon atoms such as ethyl, isopropyl, butyl, pentyl, and hexyl.

It is preferred that 95 to 99 mole percent of all organic radicals in polymer (A) be methyl radicals with any remaining radicals being mercapto radicals so that polymer (A) consists essentially of dimethylsiloxane units, trimethylsiloxane units, $HSRSi(CH_3)O$ units, and $HSRSi(CH_3)_2O_{\frac{1}{2}}$ units.

In the mercapto radical, R denotes a divalent saturated aliphatic hydrocarbon group having 2 to 8 carbon atoms such as ethylene, trimethylene, 2-methyltrimethylene, pentamethylene, hexamethylene, 3-ethylhexamethylene, and octamethylene. Mercapto radicals such as 3-mercaptopropyl and 3-mercapto-2-methylpropyl are preferred because of synthesis and odor considerations. That is, polydiorganosiloxanes bearing these mercapto radicals are more conveniently synthesized and/or have a more acceptable odor in the uncured state than polydiorganosiloxanes bearing other mercapto radicals.

It is most preferred that polymer (A) consist essentially of trimethylsiloxane units, dimethylsiloxane units, and 3-mercapto-2-methylpropylmethylsiloxane units,

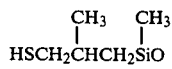

Specific examples of preferred mercapto polymer (A) include

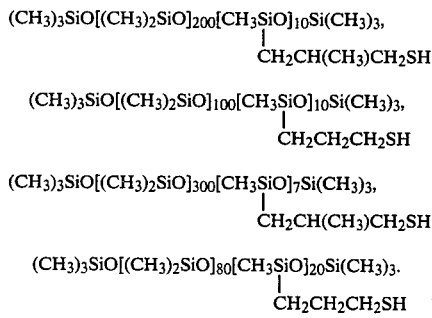

The mercapto polymers that are employed in the coating composition of this invention can be prepared by well known methods such as those described in U.S. Pat. No. 4,107,390. For example, suitable mercapto polymers may be prepared from mercaptoorgano substituted silanes or siloxanes using well known methods of hydrolysis and equilibration. It is usually preferred to prepare mercapto siloxanes by hydrolyzing a silane such as mercaptopropylmethyldichlorosilane in excess water and then equilibrating the resulting hydrolyzate with cyclopolydimethylsiloxanes and a siloxane oligomer containing trimethylsiloxane end groups using an acid catalyst such as $CF_3SO_3H$. It should be noted that linear siloxanes produced by equilibration procedures may contain small amounts such as 0 to 15 weight percent of cyclopolydiorganosiloxanes which may be volatile at temperatures up to 150° C. For the purposes of this invention either siloxanes that still contain the small amounts of cylics, or siloxanes from which the coproduced cylics have been removed by volatilization may be used.

While the mercapto polymer is described as linear, it is within the scope and spirit of this invention to permit the presence therein of trace amounts of non-linear siloxane units, i.e., $SiO_2$, and $ZSiO_{3/2}$ wherein Z is as described above, and trace amounts of other silicon-bonded radicals, such as hydroxyl and alkoxyl, which are normally incidental in commercial polydiorganosiloxanes. Preferably, the mercapto polymers are free of the non-linear siloxane units and the other radicals.

Any organosiloxane can be used as component (B) of this invention which is compatible with mercapto polymer (A) and which contains in the molecule at least two siloxane units of the general formula

                             I wherein y is 1 or 2 and Q is an unsaturated radical. Component (B) can be composed entirely of units of formula I or it can be a copolymer of units of formula I and units having the general formula

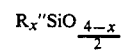

wherein x is 2 or 3 and R" denotes a saturated monovalent hydrocarbon group having 1 to 6 carbon atoms such as methyl, ethyl, propyl, isobutyl and hexyl with at least 50 mole percent of the R" groups being methyl.

The unsaturated radicals denoted by Q are independently selected from the group consisting of the vinyl radical and higher alkenyl radicals represented by the formula —$R'(CH_2)_mCH=CH_2$ wherein R' denotes —$(CH_2)_n$— or —$(CH_2)_pCH=CH$—, m has the value of 1, 2, or 3; n has the value of 3 or 6; and p has the value of 3, 4, or 5. At least 50 mole percent of the unsaturated radicals are higher alkenyl radicals. While the odor emitted upon UV curing is significantly improved when at least 50 mole percent of the unsaturated radicals are higher alkenyl radicals, it is even more preferred that essentially all the unsaturated radicals be higher alkenyl radicals to further reduce or eliminate the emission of odor.

The higher alkenyl radicals represented by the formula —$R'(CH_2)_mCH=CH_2$ contain at least 6 carbon atoms. For example, when R' denotes —$(CH_2)$—, the higher alkenyl radicals include 5-hexenyl, 6-heptenyl, 7-octenyl, 8-nonenyl, 9-decenyl, and 10-undecenyl.

When R' denotes —(CH$_2$)$_p$CH=CH$_2$—, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl are preferred because of the more ready availability of the α,ω-dienes used to prepare the alkenylsiloxanes. It is more preferred that R' denote —(CH$_2$)— so that the radicals contain only terminal unsaturation and it is most preferred that R' denote the 5-hexenyl radical.

It is preferred that the component (B) consist essentially of units selected from the group consisting of dimethylsiloxane units, trimethylsiloxane units, alkenylmethylsiloxane units, and alkenyldimethylsiloxane units. Examples of siloxane units which form component (B) of this invention include trimethylsiloxane units, dimethylsiloxane units, 5-hexenyldimethylsiloxane units, 5-hexenylmethylsiloxane units, dimethylvinylsiloxane units, methylvinylsiloxane units, dimethyl-7-octenylsiloxane units, methyl-7-octenylsiloxane units, 9-decenyldimethylsiloxane units, 9-decenylmethylsiloxane units, 5,9-decadienyldimethylsiloxane units, 6-heptenylmethylsiloxane units, and dimethyl-8-nonenylsiloxane units.

Specific examples of component (B) include ViMe$_2$SiO(Me$_2$SiO)$_{100}$(HexMeSiO)$_2$SiMe$_2$Vi, ViMe$_2$SiO(Me$_2$SiO)$_{200}$(HexMeSiO)$_{10}$SiMe$_2$Vi, HexMe$_2$SiO(Me$_2$SiO)$_{150}$(HexMeSiO)$_4$SiMe$_2$Hex, Me$_3$SiO(Me$_2$SiO)$_{10}$(HexMeSiO)$_5$SiMe$_3$, HexMe$_2$SiOSiMe$_2$Hex, Me$_3$SiO(HexMeSiO)$_{10}$SiMe$_3$ and HexMe$_2$SiO(Me$_2$SiO)$_{15}$OSiMe$_2$Hex where Me denotes the methyl radical, Hex denotes the 5-hexenyl radical, and Vi denotes the vinyl radical. The most preferred component (B) polymer for the present invention is a 5-hexenyldimethylsiloxane end-blocked copolymer of dimethylsiloxane units and 5-hexenylmethylsiloxane units. Such copolymers wherein 1.0 to 4.0 mole percent of the diorganosiloxane units are 5-hexenylmethylsiloxane units, are most preferred.

The olefinic organosiloxanes that are employed in the coating composition of this invention can be prepared by several methods. For example, known siloxanes bearing reactive groups such as SiH may be reacted with an α,ω-diene such as 1,5-hexadiene. Alternatively, suitable olefinic organosiloxanes may be prepared from alkenyl substituted silanes or siloxanes using well known methods of hydrolysis and equilibration. It is usually preferred to prepare olefinic siloxanes by hydrolyzing a silane such as 5-hexenylmethyldichlorosilane in excess water and then equilibrating the resulting hydrolyzate with cyclopolydimethylsiloxanes and a siloxane oligomer containing alkenyldimethylsiloxane end groups using a base catalyst such as KOH. However, it is believed that the olefinic polydiorganosiloxanes of this invention may also be advantageously prepared in a one-step acid-catalyzed process wherein a silane such as 5-hexenylmethyldichlorosilane is hydrolyzed and simultaneously equilibrated with cyclopolydimethylsiloxanes and 1,3-dialkenyl-1,1,3,3-tetramethyldisiloxane.

It should be noted that linear siloxanes produced by equilibration procedures may contain small amounts such as 0 to 15 weight percent of cyclopolydiorganosiloxanes which may be volatile at temperatures up to 150° C. For the purposes of this invention either siloxanes that still contain the small amounts of cylics, or siloxanes from which the coproduced cylics have been removed by volatilization may be used.

While olefinic organosiloxane is described as linear, it is within the scope and spirit of this invention to permit the presence therein of trace amounts of non-linear siloxane units, i.e., SiO$_2$, and R"SiO$_{3/2}$, wherein R" is as described above, and trace amounts of other silicon-bonded radicals, such as hydroxyl and alkoxyl, which are normally incidentally in commercial polydiorganosiloxanes. Preferably, the olefinic polydiorganosiloxanes are free of the non-linear siloxane units and the other radicals.

Mixtures of components (A) and (B) wherein the amounts of (A) and (B) are sufficient to provide a total of from 0.2 to 2.0 unsaturated radicals for every mercapto radical in the composition are useful as radiation curable compositions. For efficient curing, (A) and (B) are preferably mixed in proportions to provide from 0.4 to 0.8 unsaturated radicals for every mercapto radical in the composition, with approximately 0.5 unsaturated radicals for every mercapto radical being most preferred.

The compositions of this invention may also contain ingredients that are common to radiation-curable compositions such as photosensitizers and gelation inhibitors. An effective amount of said ingredients may be determined by simple experimentation.

A radiation-curable composition is more useful if it does not cure or gel at room temperature for a period of at least 8 hours, preferably for at least 24 hours, after being prepared. The compositions of this invention have been found to be free of gelation for more than 24 hours at room temperature in the absence of radiation. However, in certain instances, it may be desired to assure that no gelation occurs over a period of days or weeks. To this end a gelation inhibitor may be admixed with the compositions of this invention at any time prior to curing or gelation of the composition. Any suitable gelation inhibitor may be used in the compositions of this invention, but the best inhibitors known to the inventors at this time are dihydric phenols and their alkylated derivatives. More particularly, the inhibitors are pyrocatechol or hydroquinone or monoethers thereof or alkyl-substituted hydroquinone or pyrocatechol or monoethers thereof. These materials are described in "Stabilization of Polymers and Stabilizers Processes," a publication of the American Chemical Society, 1969. These inhibitors are effective in concentrations as low as approximately 50 parts per million.

To increase the rate of cure of the compositions of this invention under the action of ultraviolet light it is desirable to use an effective amount of a photosensitizer. Any suitable photosensitizer may be used such as the well-known aromatic ketones such as acetophenone, benzophenone, dibenzosuberone and benzoin ethyl ether and azo compounds such as azobisisobutyronitrile. Any suitable photosensitizer may be admixed with the compositions of this invention at any time prior to the curing of said compositions. These compounds are effective as photosensitizers in concentrations as low as approximately 500 parts per million.

The compositions of this invention may contain other non-essential ingredients such as pigments and rheology control additives which will not interfere significantly with the radiation cure of the composition.

More particularly, it should be noted that the use of controlled release additives such as the toluene soluble siloxane resins which are described as copolymers of (a)

(CH$_3$)$_3$SiO$_{\frac{1}{2}}$ units, (b) alkenyldimethylsiloxane units, and (c) SiO$_2$ units, the ratio of the (a) and (b) units to (c) units being from 0.6:1 to 1.1:1 and the silicon-bonded hydroxy content of the copolymer being no more than 0.7 weight percent, is contemplated within the scope of the present invention. It is expected that the siloxane resins wherein the alkenyl group in the (b) siloxane units is represented by the formula —R(CH$_2$)$_m$CH═CH$_2$ wherein R denotes —(CH$_2$)n— or —(CH$_2$)$_p$CH═CH— and m has the value of 1, 2, or 3; n has the value of 3 or 6; and p has the value of 3, 4, or 5 will be especially useful in the compositions of this invention because of their more rapid and complete cure with the other components of the compositions. When used, the release additives are typically employed in amounts of 5 to 45 percent by weight of the coating composition.

Coating compositions are prepared by mixing the desired amounts of the above described components and any additional components in any suitable manner such as by stirring, blending and/or tumbling and in any suitable order.

A preferred manner of practicing this invention is to prepare a two-package composition; one package comprising the triorganosiloxane-endblocked polydiorganosiloxane bearing mercaptoalkyl radicals and the other package comprising the aliphatically unsaturated curing agent. Any additional components may be included in either of the two packages as desired. When a radiation-curable composition of this invention is desired the appropriate amounts of each package may be mixed to form the composition of this invention and the composition promptly used. This manner of practicing the invention thus permits premeasured quantities of the desired components to be packaged and stored for months before use without experiencing any gelation of the individual components.

The compositions of this invention are useful as radiation-curable paint additives, coil coatings, textile treatments, water-repellant coatings, inks and the like, as well as radiation-curable release coatings.

The compositions of this invention may be applied to and cured on any suitable solid substrate such as cellulosic materials such as paper and wood; metals such as aluminum, iron and steel; plastics such as polyethylene or polypropylene films or sheets, polyethylene or polypropylene films on other surfaces such as on paper, polyamides such as nylon and polyesters such as Mylar ®, (registered trademark of E. I. DuPont de Nemours, Wilmington, Delaware); and siliceous materials such as ceramics, glass and concrete.

The compositions of this invention are particularly useful as adhesive release coatings on paper or plastic coated paper. Said compositions may be applied in a thin layer to the surface of paper to provide a coating with a mass of approximately one gram per square meter of coated paper. In the cured form these thin coatings will provide improved release of adhesives as measured by the method hereinafter described. It is to be understood that said coatings may also be applied in thinner or thicker layers as long as the radiation cure of the coating is not impaired. In the paper release coating art the amount of release coating will generally vary from approximately 0.1 to 2.0 grams per square meter.

In the method of this invention the compositions of this invention are applied to a substrate by any suitable method such as brushing, dipping, spraying, rolling and spreading. Application of said compositions to paper may be done by any of the suitable methods that are well-known in the paper coatings art such as by trailing blade coater, by an air knife, by kiss rolls, by gravure rolls, by printing or by any other known method. The compositions of this invention may be applied to the entire surface of a substrate or to any portion thereof, as desired. After the composition has been applied it is preferred to remove any solvents that may be present in the applied composition. Preferably the mixture has a viscosity such that no solvent is required to aid in the preparation of the composition or in the application of said composition to the substrate.

The applied composition of this invention is cured by exposing at least a portion thereof to energetic radiation for a length of time sufficient to cure the exposed composition and to adhere the exposed composition to the substrate. It should be understood that the entire applied composition may be exposed to radiation and cured or only a portion thereof may be exposed and cured and any uncured composition subsequently removed, as desired.

Energetic radiation, for the purposes of this invention, is radiation selected from the group consisting of actinic radiation such as ultraviolet light, X-rays and gamma rays and particulate radiation such as alpha particles and electron beams. The length of time that the compositions of this invention should be exposed to the energetic radiation, in order to cure said composition and to adhere it to the substrate, will depend upon the energy of the radiation and the intensity of the radiation that is incident on the composition. Furthermore, the effectiveness of incident radiation is dependent upon several factors. For example, it is known that low energy electron beams are more effective in an inert atmosphere such as nitrogen, than in air. Of course, it is well known that the intensity of the incident radiation is also inversely proportional to the distance between the energy source and the composition. Whatever form of energetic radiation is used in the method of this invention, the compositions of this invention are exposed to it for a length of time sufficient to cure the composition and to adhere it to the substrate.

Ultraviolet light is a preferred form of energetic radiation for curing the compositions of this invention because of its relative safety, lower cost and lower power requirements. Furthermore, ultraviolet light that contains radiation having a wave length of from approximately 200 to 400 nanometers is highly preferred for the method of this invention because such radiation will cure a composition of this invention, that has been coated on paper, within one second, as detailed in the following examples.

The following examples are presented to illustrate the invention to those skilled in the art and should not be construed as limiting the invention, which is properly delineated in the appended claims. All proportions by parts or percents are by weight unless otherwise stated.

EXAMPLE 1

5-Hexenylmethyldichlorosilane was prepared by combining 1,5-hexadiene (160 g, 1.95 m), 0.1 g of a platinum complex

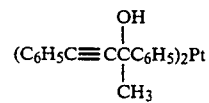

and methyldichlorosilane (5 g) in a flask equipped with a condenser and a thermometer. The mixture was heated to 40° C. to initiate the reaction. Additional methyldichlorosilane (120 g) was added dropwise to the mixture so that the temperature was kept below 55° C. The product was isolated in 87.6% yield by distillation under reduced pressure (bp 67°-9° C./2 mm Hg).

EXAMPLE 2

Hydrolyzate of 5-hexenylmethyldichlorosilane was prepared by adding water (225 g) to a mixture of the silane (100 g) in toluene (75 g) and stirring for 1.5 hours. The toluene layer was separated from the water and washed first with 10% aqueous sodium bicarbonate (115 ml) and then with three portions of water (75 ml). The residue was stripped on a rotary evaporator (92° C./8 mm Hg), treated with magnesium chloride and activated charcoal, and filtered through a filter aid. The hydrolyzate was a lightly tinted fluid having a —CH=CH$_2$ content of 18.6% versus a theoretical value of 19.01%.

EXAMPLE 3

5-Hexenyldimethylchlorosilane was prepared by combining 1,5-hexadiene (164 g) and 0.05 g of platinum complex

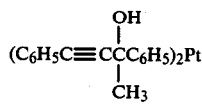

in a flask equipped with a condenser, addition-funnel and a thermometer. Dimethylchlorosilane (92 g) was added at such a rate that the pot temperature did not rise above 40° C. The mixture was allowed to stand at room temperature for 48 hours. The product was isolated in 68% yield by distillation under reduced pressure (bp 39°-40° C./2.2 mm Hg).

EXAMPLE 4

5-Hexenyl-endblocked polydimethylsiloxane fluid was prepared by combining 5-hexenyldimethylchlorosilane (124.27 g), hydroxyl-endblocked polydimethylsiloxane having about 4% silicon bonded hydroxyl groups (345 g), and toluene (100 g) in a flask and heating to reflux for 14 hours. After cooling, triethylamine (30 g) was added and the mixture stirred for two hours before filtering. The filtrate was stripped under vacuum to remove volatiles up to 100° C. at 1 mm Hg. The residue was decolorized by stirring with Fuller's Earth (5 g) for two hours and then filtered to yield 370.1 g of colorless polysiloxane fluid.

EXAMPLE 5

5-Hexenyl-endblocked copolymer of dimethylsiloxane units and 5-hexenylmethylsiloxane units was prepared by mixing cyclopolydimethylsiloxanes (17.4 g), hydrolyzate of 5-hexenylmethyldichlorosilane from Example 2 (0.85 g), 5-hexenyl-endblocked polydimethylsiloxane fluid from Example 4 (5.5 g), and KOH (0.1 g) in a flask and heating to 150° C. for 5 hours. After cooling, carbon dioxide was bubbled through the mixture for 30 minutes to neutralize the KOH. The material was filtered to yield a copolymer generally conforming to the average formula

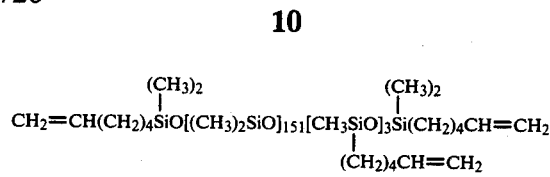

EXAMPLE 6

A radiation curable composition was prepared by mixing trimethylsiloxane-endblocked copolymer of dimethylsiloxane units and mercaptoalkylmethylsiloxane units (2.5 g) with the 5-hexenyl-endblocked copolymer of dimethylsiloxane units and 5-hexenylmethylsiloxane units prepared in Example 5 (2.23 g). The ratio of unsaturated radicals to mercapto radicals in the composition was about 0.58. The mercapto containing polymer had a viscosity of 1200 centistokes at 25° C. and generally conforms to the average formula

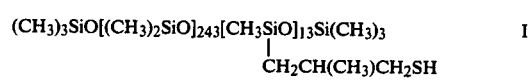

The composition was applied to low density polyethylenecoated paper at a coating weight of about 1.3 g/m$^2$. Coated paper was passed under a 2 MV electron beam and cured with 1.5 megarads of radiation. No obnoxious odor could be detected. The coating was considered cured when a condition of no smear, no rub off, and no migration was found. The extent of rub off is determined by rubbing the coating with the index finger to see if it is removed. A coating is considered to show no migration if a piece of adhesive tape will stick to itself after having first been adhered to the coating and then removed and its adhesive-bearing surfaces doubled back on itself.

To show that this composition can also cure under UV radiation, 2 weight percent of benzophenone was added to a portion of the composition and the modified coating was applied to polyethylene-coated paper as above. The coating cured to no smear, no rub off, and no migration when passed under a UV lamp at a speed of 70 feet per minute with essentially no obnoxious odor detected.

EXAMPLE 7

Mercaptopolymer I (5 g) was mixed with a vinyldimethylsiloxane-endblocked copolymer of dimethylsiloxane units and 5-hexenylmethylsiloxane units (3.15 g) to give a homogeneous curable composition. The vinyldimethylsiloxane-endblocked copolymer had a viscosity of 310 centistokes at 25° C. and generally conformed to the average formula

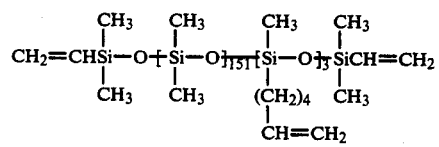

The composition was applied to polyethylene-coated paper as in Example 6 and was found to cure under the electron beam after 3 megarads of radiation. The level of obnoxious odor was substantially reduced in comparison to the cure of similar compositions in which all the unsaturated groups are vinyl.

The cured release coating was prepared for release testing by laminating immediately after curing with Monsanto® GMS-263 acrylic adhesive according to the following procedure. Acrylic adhesive solution was applied to the cured coating at a wet thickness of 3 mils using a Bird bar. The adhesive was heated at 70° C. for 60 seconds and then cooled to room temperature again for 1 minute. A sheet of 60 pound matte litho was applied to the dried adhesive and the resulting laminate was rolled with a 4.5 pound rubber-coated roller and aged for 24 hours at room temperature.

Release testing of the laminates was accomplished by cutting the laminates into 1 inch wide strips and pulling the matte/adhesive lamina from the paper/silicone lamina at an angle of 180 degrees at 400 inches per minute. The force that was required to separate the laminae was 75 grams per inch.

EXAMPLE 8

This example illustrates that compounds containing external double bonds effect cure with mercapto polymers under conditions of electron beam irradiation much more readily than compounds containing internal double bonds.

Mercapto polymer I (10 g) was mixed with 1,1,3,3-tetramethyl-1,3-bis(5-hexenyl)disiloxane (0.68 g) and coated onto S2S kraft paper. The coating cured to no smear, no rub off, and no migration when exposed to 1.5 megarads of electron beam radiation. The release force when tested as described in Example 7 was 45 g/in.

For comparison, mixtures containing mercapto polymer I (10 g) and either 1,1,3,3-tetramethyl-1,3-dicyclohexenylethyldisiloxane (0.70 g) or 1,1'-oxybis(1-methyl-1-silacyclopentene) (0.42 g) were coated onto S2S kraft paper and exposed to electron beam radiation. In each case, the coatings did not cure even when exposed to 6 megarads of radiation.

EXAMPLE 9

This example illustrates that siloxanes containing trimethylsiloxane endblocking with only pendant alkenyl groups do not effect cure with mercapto polymers under conditions of electron beam irradiation as readily as siloxanes containing alkenyldimethylsiloxane endblocking in addition to pendant alkenyl groups.

A mixture of mercapto polymer I (5 g) and a trimethylsiloxane endblocked polymer (1.6 g) which generally conformed to the average formula

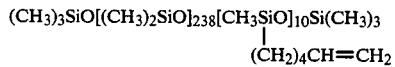

was coated onto S2S kraft paper and exposed to electron beam radiation. The coating did not cure even when exposed to 6 megarads of radiation.

EXAMPLE 10

This example presents a comparison of the rate of UV radiation cure of compositions which contain either 5-hexenyl functional siloxanes or cyclohexenylethyl functional siloxanes.

Composition A was prepared by mixing mercapto polymer I (5 g), 1,1,3,3-tetramethyl-1,3-bis(5-hexenyl)-disiloxane (0.34 g), and benzophenone (0.1 g). The mixture was heated to 50° C. to solubilize the benzophenone.

Composition B was prepared by mixing mercapto polymer I (2.5 g), 5-hexenyl functional polymer prepared in example 5 (2.23 g), and benzophenone (0.1 g).

Composition C was prepared by mixing mercapto polymer II (32.8 parts), cyclohexenylethyl functional polymer I (65.7 parts), and benzophenone (1.5 parts). Mercapto polymer II is a trimethylsiloxane-endblocked copolymer of dimethylsiloxane units and mercaptopropylmethylsiloxane units with a viscosity of about 300 centistokes at 25° C. and generally conforms to the average formula

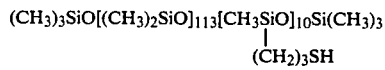

Cyclohexenylethyl functional polymer I is a trimethylsiloxane-endblocked copolymer of dimethylsiloxane units and cyclohexenylethylmethylsiloxane units with a viscosity of about 2,000 centistokes at 25° C. and generally conforms to the average formula

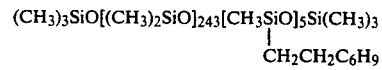

Each composition was coated onto S2S kraft paper using a trailing blade coater at 30 psi blade pressure. The coatings were cured by passing, at a distance of about 80 mm, under a 20 inch Hanovia medium pressure lamp having an input of 200 watts/inch, an output of 1.4 kW/m in the ultraviolet and a UV maximum at 366 nm. The cure rates of the coatings were compared by determining the speed at which each coating could be passed under the lamp and still obtain cure. The lamp had a window 7 inches wide so that a speed of 60 ft/min. resulted in an exposure time of 0.58 second. Compositions A and B cured at a speed of 60 ft/min., while composition C cured only at speeds of 30 ft/min. or less. Each coating was considered cured when a condition of no smear, no rub off, and no migration was found.

That which is claimed is:

1. A radiation-curable composition comprising:
(A) a triorganosiloxane-endblocked polydiorganosiloxane polymer having a viscosity of at least 100 centistokes at 25° C., wherein from 50 to 99 mole percent of all organic radicals are methyl, from 1 to 10 mole percent of all organic radicals are mercapto radicals represented by the formula —RSH wherein R denotes a divalent saturated aliphatic hydrocarbon group having from 2 to 8 carbon atoms, any remaining organic radicals in (A) being phenyl radicals or alkyl radicals having from 2 to 6 carbon atoms and
(B) an organosiloxane, compatible with polymer (A), having in the molecule at least two siloxane units of the general formula

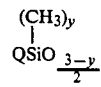

wherein y is 1 or 2 and Q is an unsaturated radical independently selected from the group consisting of the vinyl radical and higher alkenyl radicals represented by the formula —R'(CH$_2$)$_m$CH═CH$_2$ wherein R' denotes —(CH$_2$)$_n$— or —(CH$_2$)$_p$CH═CH— and m has the value of 1, 2, or 3; n has the value of 3 or 6; and p has the value of 3, 4, or 5, with the proviso that at least 50 mole percent of the unsaturated radicals are higher alkenyl radicals, any remaining siloxane units having the general formula $$R_x''SiO_{\frac{4-x}{2}}$$

wherein x is 2 or 3 and R'' denotes a saturated monovalent hydrocarbon group having from 1 to 6 carbon atoms, at least 50 mole percent of the total R'' groups being methyl, the amounts of (A) and (B) being sufficient to provide a total of from 0.2 to 2.0 unsaturated radicals for every mercapto radical in the composition.

2. The composition of claim 1 wherein from 95 to 99 mole percent of all organic radicals in the triorganosiloxane-endblocked polydiorganosiloxane polymer are methyl radicals, any remaining radicals being mercapto radicals.

3. The composition of claim 2 wherein the triorganosiloxane-endblocked polydiorganosiloxane polymer has a viscosity of 100 to 1000 centistokes at 25° C. and R denotes a trimethylene radical or a 2-methyltrimethylene radical.

4. The composition of claim 3 wherein the triorganosiloxane-endblocked polydiorganosiloxane polymer consists essentially of trimethylsiloxane units, dimethylsiloxane units, and $$\overset{CH_3}{\underset{|}{HSCH_2CHCH_2SiO}}\overset{CH_3}{\underset{|}{}}$$

units.

5. The composition of claim 4 wherein organosiloxane (B) has a viscosity at 25° C. of 25 to 1000 centistokes and is a dimethylvinylsiloxane-endblocked polydiorganosiloxane polymer consisting essentially of dimethylsiloxane units and alkenylmethylsiloxane units wherein the alkenyl radicals are represented by the formula —R(CH$_2$)$_m$CH=CH$_2$ wherein R denotes —(CH$_2$)$_n$— or —(CH$_2$)$_p$CH=CH— and m has the value of 1, 2, or 3; n has the value of 3 or 6; and p has the value of 3, 4, or 5.

6. The composition of claim 4 wherein the unsaturated radicals in the organosiloxane (B) are higher alkenyl radicals represented by the formula —R(CH$_2$)$_m$CH=CH$_2$ wherein R denotes —(CH$_2$)$_n$— or —(CH$_2$)$_p$CH=CH— and m has the value of 1, 2, or 3; n has the value of 3 or 6; and p has the value of 3, 4, or 5.

7. The composition of claim 6 wherein the siloxane units of the organosiloxane (B) are selected independently from the group consisting of dimethylsiloxane units, trimethylsiloxane units, alkenylmethylsiloxane units, and alkenyldimethylsiloxane units.

8. The composition of claim 7 wherein the alkenyl radicals in organosiloxane (B) are selected from the group consisting of 5-hexenyl, 7-octenyl, 9-decenyl, and 5,9-decadienyl radicals.

9. The composition of claim 8 wherein organosiloxane (B) is 1,1,3,3-tetramethyl-1,3-dialkenyldisiloxane.

10. The composition of claim 8 wherein organosiloxane (B) is a 5-hexenyldimethylsiloxane-endblocked copolymer of dimethylsiloxane and 5-hexenylmethylsiloxane units.

11. The composition of claim 10 wherein 1.0 to 4.0 mole percent of the diorganosiloxane units in organosiloxane (B) are 5-hexenylmethylsiloxane units.

12. A method of treating a substrate to improve the release of adhesive materials therefrom, the method comprising (I) applying to the substrate a composition comprising
  (A) a triorganosiloxane-endblocked polydiorganosiloxane polymer having a viscosity of at least 100 centistokes at 25° C., wherein from 50 to 99 mole percent of all organic radicals are methyl, from 1 to 10 mole percent of all organic radicals are mercapto radicals represented by the formula —RSH wherein R denotes a divalent saturated aliphatic hydrocarbon group having from 2 to 8 carbon atoms, any remaining organic radicals in (A) being phenyl radicals or alkyl radicals having from 2 to 6 carbon atoms and
  (B) an organosiloxane having in the molecule at least two siloxane units of the general formula $$\overset{(CH_3)_y}{\underset{|}{QSiO_{\frac{3-y}{2}}}}$$

wherein y is 1 or 2 and Q is an unsaturated radical independently selected from the group consisting of the vinyl radical and higher alkenyl radicals represented by the formula —R'(CH$_2$)$_m$CH=CH$_2$ wherein R' denotes —(CH$_2$)$_n$— or —(CH$_2$)$_p$CH=CH— and m has the value of 1, 2, or 3; n has the value of 3 or 6; and p has the value of 3, 4, or 5, with the proviso that at least 50 mole percent of the unsaturated radicals are higher alkenyl radicals, any remaining siloxane units having the general formula $$R_x''SiO_{\frac{4-x}{2}}$$

wherein x is 2 or 3 and R'' denotes a saturated monovalent hydrocarbon group having from 1 to 6 carbon atoms, at least 50 mole percent of the total R'' groups being methyl, and the amounts of (A) and (B) being sufficient to provide a total of from 0.2 to 2.0 unsaturated radicals for every mercapto radical in the composition;

(II) exposing the applied composition to energetic radiation sufficient to cure the composition.

13. The method of claim 12 wherein the composition further comprises an effective amount of a photosensitizing compound and the applied composition is exposed to ultraviolet radiation having a wavelength of 200 to 400 nanometers.

14. The method of claim 12 wherein the composition is exposed to electron beam radiation.

15. The method of claim 14 wherein from 95 to 99 mole percent of all organic radicals in the triorganosiloxane-endblocked polydiorganosiloxane polymer are methyl radicals, any remaining radicals being mercapto radicals.

16. The method of claim 15 wherein the triorganosiloxane-endblocked polydiorganosiloxane polymer has a viscosity of 100 to 1000 centistokes at 25° C. and R denotes a trimethylene radical or a 2-methyltrimethylene radical.

17. The method of claim 16 wherein the triorganosiloxane-endblocked polydiorganosiloxane polymer consists essentially of trimethylsiloxane units, dimethylsiloxane units, and

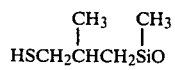

units.

18. The method of claim 17 wherein organosiloxane (B) has a viscosity at 25° C. of 25 to 1000 centistokes and is a dimethylvinylsiloxane-endblocked polydiorganosiloxane polymer consisting essentially of dimethylsiloxane units and alkenylmethylsiloxane units wherein the alkenyl radicals are represented by the formula —R(CH$_2$)$_m$CH=CH$_2$ wherein R denotes —(CH$_2$)$_n$— or —(CH$_2$)$_p$CH=CH— and m has the value of 1, 2, or 3; n has the value of 3 or 6; and p has the value of 3, 4, or 5.

19. The method of claim 17 wherein the unsaturated radicals in the organosiloxane (B) are higher alkenyl radicals represented by the formula —R(CH$_2$)$_m$CH=CH$_2$ wherein R denotes —(CH$_2$)$_n$— or —(CH$_2$)$_p$CH=CH— and m has the value of 1, 2, or 3; n has the value of 3 or 6; and p has the value of 3, 4, or 5.

20. The method of claim 19 wherein the siloxane units of the organosiloxane (B) are selected independently from the group consisting of dimethylsiloxane units, alkenylmethylsiloxane units, and alkenyldimethylsiloxane units.

21. The method of claim 20 wherein the alkenyl radicals in organosiloxane (B) are selected from the group consisting of 5-hexenyl, 7-octenyl, 9-decenyl, and 5,9-decadienyl radicals.

22. The method of claim 21 wherein organosiloxane (B) is 1,1,3,3-tetramethyl-1,3-dialkenyldisiloxane.

23. The method of claim 22 wherein 1.0 to 4.0 mole percent of the diorganosiloxane units in organosiloxane (B) are 5-hexenylmethylsiloxane units.

* * * * *